United States Patent
Klassen

(10) Patent No.: US 10,284,117 B2
(45) Date of Patent: May 7, 2019

(54) BUCKLING WAVE DISK

(71) Applicant: Genesis Advanced Technology Inc., Langley (CA)

(72) Inventor: James Brent Klassen, Langley (CA)

(73) Assignee: Genesis Advanced Technology Inc., Langley (CA)

( * ) Notice: Subject to any disclaimer, the term of this patent is extended or adjusted under 35 U.S.C. 154(b) by 376 days.

(21) Appl. No.: 15/309,431

(22) PCT Filed: May 5, 2015

(86) PCT No.: PCT/CA2015/050393
§ 371 (c)(1),
(2) Date: Nov. 7, 2016

(87) PCT Pub. No.: WO2015/168787
PCT Pub. Date: Nov. 12, 2015

(65) Prior Publication Data
US 2017/0187308 A1   Jun. 29, 2017

Related U.S. Application Data

(60) Provisional application No. 61/988,888, filed on May 5, 2014, provisional application No. 62/075,087, filed on Nov. 4, 2014.

(51) Int. Cl.
*H02K 7/06* (2006.01)
*H02N 2/10* (2006.01)
(Continued)

(52) U.S. Cl.
CPC ........... *H02N 2/105* (2013.01); *F16H 49/001* (2013.01); *H02K 7/075* (2013.01); *H02K 41/06* (2013.01);
(Continued)

(58) Field of Classification Search
CPC .......... H02N 2/10; H02N 2/105; F16H 49/00; F16H 49/001; F16H 2049/003; F16H 2049/006; H02K 7/075; H02K 41/06
(Continued)

(56) References Cited

U.S. PATENT DOCUMENTS

| 3,389,274 A | 6/1968 | Robertson |
| 5,148,068 A | 9/1992 | Kushida et al. |

(Continued)

FOREIGN PATENT DOCUMENTS

| CA | 2 813 000 A1 | 4/2012 |
| CA | 2 877 403 A1 | 12/2013 |

(Continued)

OTHER PUBLICATIONS

International Search Report for Application No. PCT/CA2015/050393 dated May 5, 2015, 3 pages.
(Continued)

*Primary Examiner* — Naishadh N Desai
(74) *Attorney, Agent, or Firm* — Seed Intellectual Property Law Group LLP

(57) ABSTRACT

A power conversion device has a buckled wave disk that has an axis and is radially compressed between a hub and a wave ring. The buckled wave disk is buckled in the radial direction to form circumferential waves which are displaced in the axial direction and extending around the buckled wave disk with lines formed of inflection points of the circumferential waves extending between the hub and wave ring. The wave ring is outwardly radially displaced at nodes corresponding to lines formed of inflection points of the circumferential waves. A wave propagation actuator cooperates with the buckled wave disk for driving a wave and the lines formed of inflection points of the circumferential waves around the buckled wave disk. An outer ring surrounds the wave ring,
(Continued)

the outer ring being driven by or driving the wave ring at the nodes. A method of making a wave disk is provided.

17 Claims, 6 Drawing Sheets

(51) Int. Cl.
*H02K 41/06* (2006.01)
*F16H 49/00* (2006.01)
*H02K 7/075* (2006.01)

(52) U.S. Cl.
CPC .. *F16H 2049/003* (2013.01); *F16H 2049/006* (2013.01)

(58) Field of Classification Search
USPC ... 310/74, 75 R, 76, 78, 80, 82, 84, 92, 100, 310/102 A, 102 R, 103
See application file for complete search history.

(56) References Cited

U.S. PATENT DOCUMENTS

| | | | |
|---|---|---|---|
| 5,834,878 A * | 11/1998 | Nakanishi | H02N 2/163 310/323.01 |
| 6,155,220 A | 12/2000 | Marriott | |
| 6,437,485 B1 | 8/2002 | Johansson | |
| 6,664,711 B2 | 12/2003 | Baudendistel | |
| 7,161,278 B2 | 1/2007 | Johansson | |
| 7,247,116 B2 | 7/2007 | Stoianovici et al. | |
| 7,999,422 B2 | 8/2011 | Dorel | |
| 2005/0253675 A1* | 11/2005 | Davison | F16H 49/001 335/220 |
| 2015/0369300 A1* | 12/2015 | Biermann | F16D 13/52 192/70.11 |

FOREIGN PATENT DOCUMENTS

| | | | | |
|---|---|---|---|---|
| CA | 2877403 A1 * | 12/2013 | | H02N 2/105 |
| WO | 2010/000302 | 1/2010 | | |

OTHER PUBLICATIONS

Kenji Uchino, Piezoelectric Ultrasonic Motors: Overview, Smart Mater. Struct. 7, 1998, p. 273-285.

Hai-Lin Zhu et al., Minimal Tooth Number of Flexspline in Harmonic Gear Drive With External Wave Generator, Geartechnology, Oct. 2013, p. 58-62.

* cited by examiner

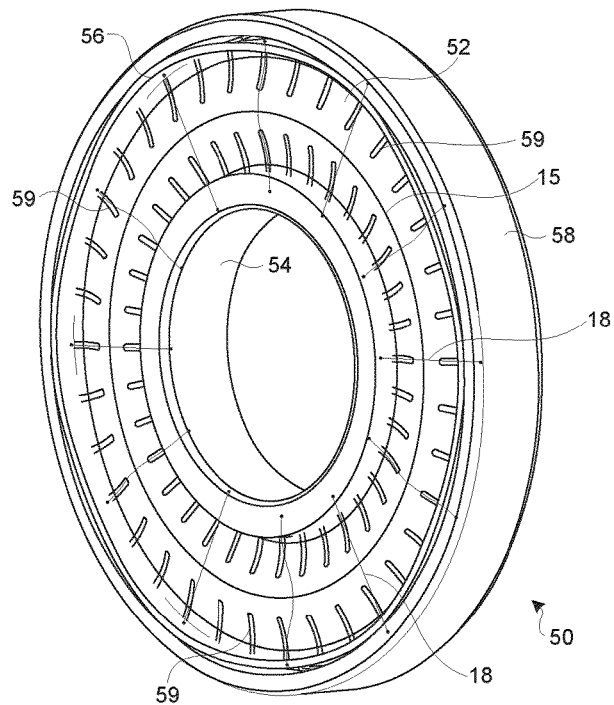
FIG. 5
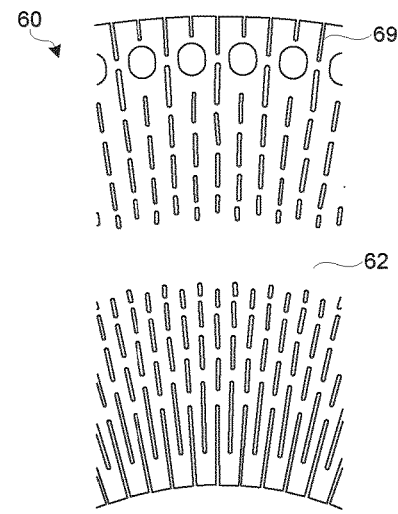
FIG. 6
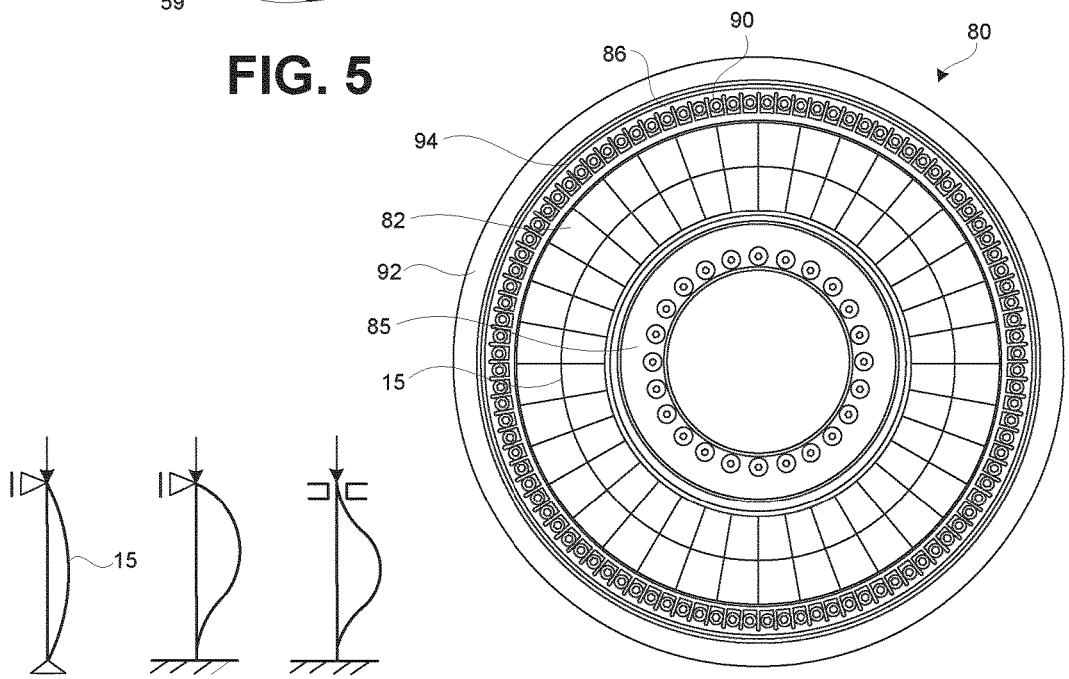
FIG. 7
FIG. 8

BUCKLING WAVE DISK

CROSS-REFERENCE TO RELATED APPLICATIONS

This application claims the benefit under 35 U.S.C. § 119(e) of U.S. provisional patent applications No. 61/988,888, filed May 5, 2014, and 62/075,087, filed Nov. 4, 2014.

BACKGROUND

Technical Field

Actuators.

Description of the Related Art

Power conversion can have many forms and uses. For example, torque transmission is required for many devices including but not limited to robotics and electric motor drives. Also, gear reducers are commonly used to convert the high speed rotation of an electric motor into a higher torque but lower speed rotary motion output. A new device is disclosed to provide power conversion.

BRIEF SUMMARY

In an embodiment, there is provided a power conversion device comprising a buckled wave disk having an axis and being radially compressed between a hub and a wave ring. The buckled wave disk is buckled in the radial direction to form circumferential waves which are displaced in the axial direction and extending around the buckled wave disk with lines formed of inflection points of the circumferential waves extending between the hub and wave ring. The wave ring is outwardly radially displaced at nodes corresponding to lines formed of inflection points of the circumferential waves. A wave propagation actuator cooperates with the buckled wave disk for driving a wave and the lines formed of inflection points of the circumferential waves around the buckled wave disk. An outer ring surrounds the wave ring, the outer ring being driven by or driving the wave ring at the nodes.

In an embodiment, there is also provided a method of power conversion, comprising providing a buckled wave disk having an axis and being radially compressed between a hub and a wave ring, the buckled wave disk being buckled in the radial direction to form circumferential waves which are displaced in the axial direction and extending around the buckled wave disk with lines formed of inflection points of the circumferential waves extending between the hub and wave ring, the wave ring being outwardly radially displaced at nodes corresponding to lines formed of inflection points of the circumferential waves, causing a wave propagation actuator to cooperate with the buckled wave disk to drive or be driven by a wave and the lines formed of inflection points of the circumferential waves around the buckled wave disk, and further providing an outer ring surrounding the wave ring, the outer ring being driven by or driving the wave ring at the nodes.

In an embodiment, there is also provided a manufacturing process for a buckling wave disk comprising providing a disk having sections toward the inner diameter ID and outer diameter OD of the disk that are circular and planar and having a circular section larger than the ID and smaller than the OD that is rotationally symmetric and without a wave shape before forming, and plastically compressing the disk between forming members to circumferentially lengthen the material of the disk between the section toward the ID and the section toward the OD beyond the elastic limit of the disk so that a permanent circumferential wave is formed in the disk while the disk is in contact with the forming members and/or after the disk is removed from the forming members.

The features of the dependent claims are included here and may depend on the provided embodiments of the device and method of power conversion.

BRIEF DESCRIPTION OF THE SEVERAL VIEWS OF THE DRAWINGS

There will now be described embodiments of a buckling wave disk with reference to the figures, in which like reference characters denote like elements, and in which:

FIG. 5 is a schematic image of buckling wave disk that is shown here with an example of how radial slots can be used to increase the flexibility of the disk which will also reduce the precision requirement of fabrication.

FIG. 6 shows a buckling wave disk with slots.

FIG. 7 shows three different types of radial disk buckling that could be employed.

FIG. 8 is a side elevation view of a third example of a buckling wave disk.

DETAILED DESCRIPTION

Figure 1:
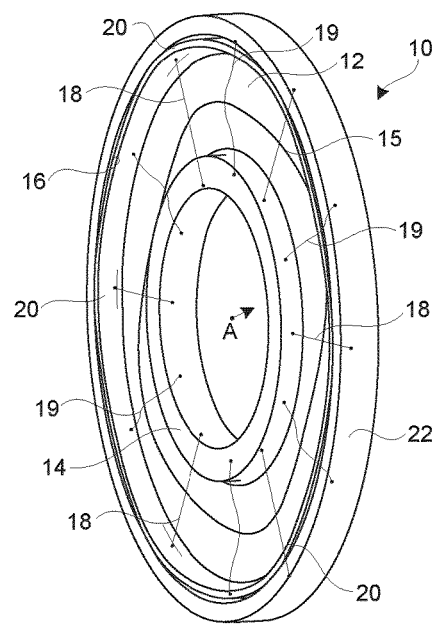
FIG. 1 shows an exemplary buckling wave disk.
Figure 2:
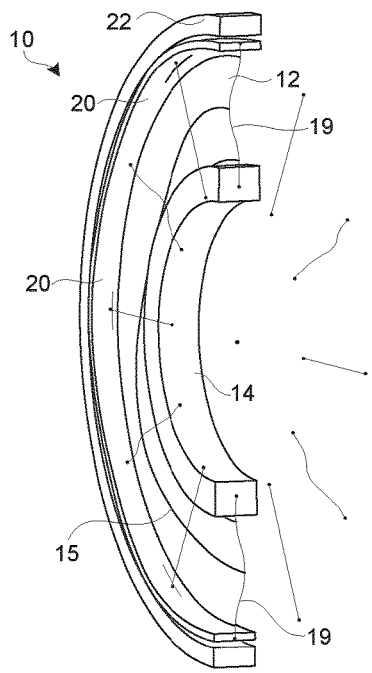
FIG. 2 shows a section view of an exemplary buckling wave disk.
Figure 3:
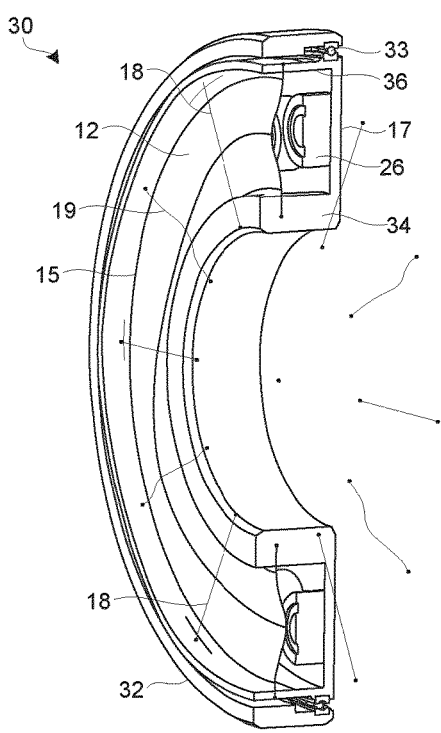
FIG. 3 shows a section view of a second exemplary buckling wave disk with fixed hub to flex spline (wave ring) and bearing positioning outer ring.
Figure 4:
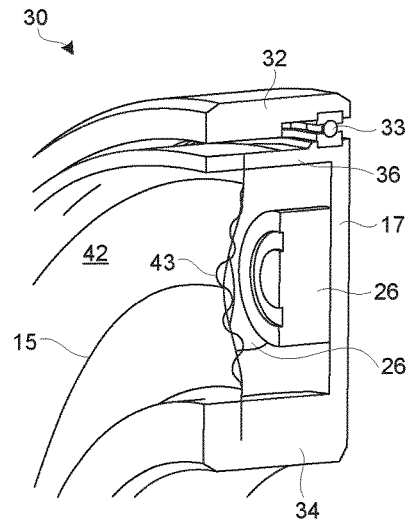
FIG. 4 shows a schematic of a buckling wave disk with bellows shape.
Figure 9:
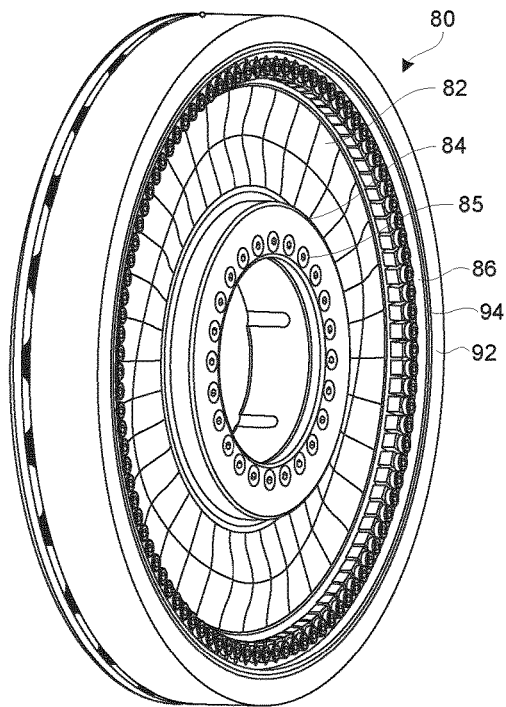
FIG. 9 is a perspective view of the third example of a buckling wave disk.
Figure 10:
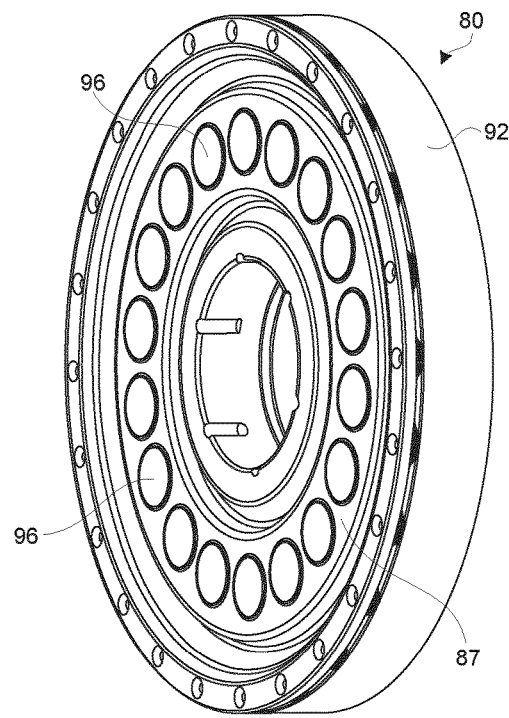
FIG. 10 is a second perspective view of the third example of a buckling wave disk.
Figure 11:
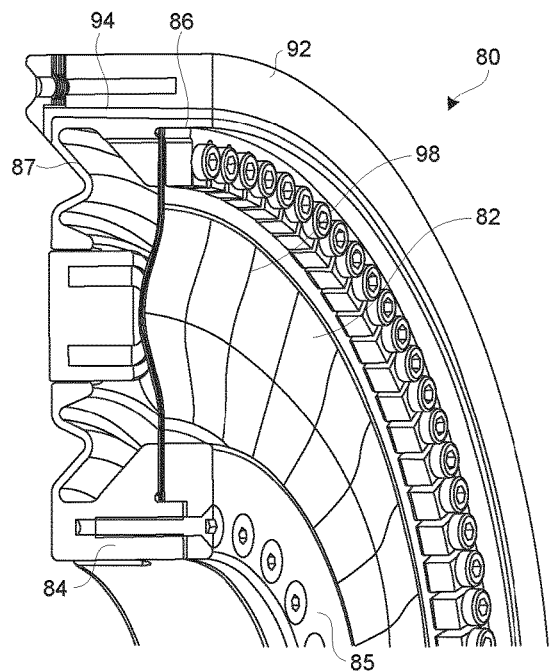
FIG. 11 is a third perspective view, partly cut away, of the third example of a buckling wave disk.

Referring to FIGS. 1 and 2, there is shown a first embodiment of a power conversion device 10. The power conversion device 10 comprises a buckled wave disk 12 having an axis A and being radially compressed between a hub 14 and a wave ring 16. The buckled wave disk 12 is buckled by displacement in the axial direction A with lines of zero axial displacement 18 extending between the hub 14 and wave ring 16. Maximum radial displacement may occur along the center line 15 of the buckled wave disk 12. The center line 15 is a line of equal radius from the hub 14 and wave ring 16 and it follows a wavy pattern in the circumferential direction as shown in FIGS. 1-4. The wave ring 16 is outwardly radially displaced at nodes or apexes 20 corresponding to the lines of reduced or zero axial displacement 18 relative to other points on the circumference of the wave ring 16. A circular outer ring 22 surrounds the wave ring 16 and is driven by displacement of the wave ring 16 at the nodes 20. A wave propagation actuator, not shown in FIGS. 1 and 2, but an example is shown in FIGS. 3 and 4, cooperates with the disk 12 to propagate wave around the disk 12, which causes the nodes 20 to move around the wave ring 16 and cause the outer ring 22 to move due to the non-circular outer diameter OD of the wave ring having a shorter circumferential length than the circular inner diameter ID of the outer ring. The outer ring 22 may be coupled to various devices, such as robotic devices to drive the devices and thus the outer ring 22 functions as an outer ring. In reverse operation, the outer ring 22 may drive the wave ring 16 to produce power, such as, for example, to produce electricity. The wave disk 12 may be made of Nitinol, which is an alloy of nickel and titanium. The wave ring 16 is in circumferential tension, which places a compressive load on the wave disk 12.

In some instances, the radial lines of zero axial displacement, for example when the wave disk 12 has a wavy or bellows construction in the radial direction, as shown in FIG. 4, will correspond to a radially extending zone over which the average radial displacement is zero. At points in the wave disk 12 of equal radial distance from the hub 14, such as the center line 15, the wave disk 12 follows a wave pattern in the circumferential direction. The wave pattern may be sinusoidal. The wave shape can be seen in the lines 19 that show how the disk 12 has axial displacement in the path of the line 15 or in the path of other interior circumferential lines formed of points that have equal distance from the hub 14. The lines 18 show the lines or zones of zero axial displacement. The wave pattern has a point of inflection which lies in the radial line of zero axial displacement. The points of inflection for all the waves that are at equal radial distance from the hub cumulatively create the radial lines 18 of zero axial displacement or the radially aligned zones 18 of average zero axial displacement.

The working principle of the buckled wave disk takes advantage of the difference between the radial force exerted by an elastically buckling structure when the structure is aligned between opposite buckled displacement modes and when it is buckled.

The buckling wave disk 12 may be a thin, elastically buckling disk with a center through-hole supported from inward compression by the hub 14, which may be a rigid cylinder or rod contacting the inner diameter of the disk 12. The wave ring 16 may take the form of a cylindrical member surrounding the disk that generates a radially inward force on the outer edge of the disk 12. During the application of this radially inward force (during original assembly), the disk 12 is caused, by an external means (assembly fixture), to buckle in both axial directions in two or more equally spaced areas. This produces an axial wave with the radially aligned section 18 where each axial wave crosses the mid plane of the disk. The number of waves can be set as one in both directions but may be two or more in both directions.

Midway along each axial wave (in the circumferential direction) there will be a radial aligned section 18 of the disk 12 which is able to exert a greater radially outward force on the annular ring 16 as compared to the displaced (buckled) sections. The annular ring 16 is flexible enough to allow this increased force at each radially aligned position 18 to result in a radially outward displacement of the annular disk 16. The result is a radial wave in the OD of the buckling disk 14 and the annular ring 16. The parts 12, 14 and 16 together comprise a fixed member (for purpose of this description) of the torque producing device.

The outer member 22 of the torque producing device 10 may be a rigid cylindrical ring which surrounds the annular wave ring 16 and which has an ID that is larger than the circumference of the wave ring OD. The radial wave crests or nodes 20 of the wave ring 16 may be preloaded contact with the ID of the outer ring 22.

This preload can be substantial due to the force generated by the buckling wave disk 10 (or disks 10 if multiple buckling wave disks are used). In one configuration, traction between the wave ring 16 and the outer ring 22 is used to transmit torque from the fix member to the outer member 22. Movement of the outer member 22 (and torque, if there is external resistance to this rotation) is produced as a result of the bucking wave disk waves traveling in a circular manner around the center axis of the device. This rotational axial wave propagation results in a propagation of the radial wave in the same direction and a progression of the node contacts 20 between the wave ring 16 and the outer ring 22. Torque transmission is then accomplished in a manner similar to a flexible wave spline drive such as a harmonic drive with the following characteristics, some or all of which are believed to be unique.

By using a preloaded traction interface between the wave ring 16 and the outer ring 22, a very small gap can be achieved circumferentially midway between the contact points 20 because there is no need to create clearance for opposing gear teeth to clear each other. This has several advantages which include the following:

The smaller the difference between the OD of the wave ring 16 and the ID of the outer ring 22, the higher the ratio of wave orbit to output rotation. Higher ratios mean that it takes less force to move the waves for a given output torque which allows a reduced wave propagation actuation input force such as from an electromagnet array or piezo material as described later in this disclosure. In the case of both the electromagnet and piezo material, the wave propagation actuator may be rotationally fixed with respect to the wave disk 12.

A smaller difference between the OD of the wave ring 16 and the ID of the outer ring 22 also allows more than two contact points 20 between the wave ring 16 and the outer ring 22 within the elastic stress limits of the wave disk and wave ring. In operation, the stress on all flexible components must be below the elastic limit of the materials and preferably below the endurance limit of the materials for a desired life cycle). Two contact points is common to wave member actuators such as harmonic drives, but this requires the outer ring to be more rigid than if more than two contacts are used. With more than two contacts, the forces acting outwardly on the outer ring 22 are distributed more consistently around the ID of the outer ring 22 so the bending stress on this member is reduced because the radial forces acting on it are more distributed and result in increased circumferential tension and decreased radial bending.

More than two contact points also allows the wave ring 16 to provide a radial bearing support for the outer member 22 which can reduce or eliminate the need for a separate radial bearing support.

With a minimal radial wave amplitude, it is also possible to use a more rigid flex spline member, allowing the actuator 10 to be lower profile if desired. In an embodiment of the device, the buckling wave disk 12 is held by a structure which is rigid on the ID of the wave disk 12, relatively rigid in the axial direction on the OD of the wave disk 12, and relatively flexible in the radial direction on the OD of the wave disk 12. A housing 17 may connect the hub 14 and wave ring 16. The wave ring 16 may connect to the housing 17 through a cylindrical flexure 36 that allows adequate radial movement of the wave disk 12 with minimal movement of the OD of the wave disk 12 in the axial direction), seen in FIGS. 3-4. By holding the ID of the wave disk 12 rigidly to the fixed hub 14, and the OD to the wave ring 16, and by semi-rigidly attaching the wave ring 16 to the fixed hub 12 for example through disk member 17, the waves in the buckle wave ring 12 can propagate with elastic deformation of all components and minimal sliding resistance. Theoretically, the only resistance will be internal hysteresis of the materials which, for metal, is very low. Flexure cylinder 36 is attached to, or one piece with, the wave ring 16 and allows radial displacement of the wave disk OD. It is torsionally rigid enough to transmit torque from the ring 16 to the hub 34 via housing 17. For these reasons, the wave can be propagated with very little force relative to the force which is being exerted radially on the wave ring 16.

Figures 12, 13:
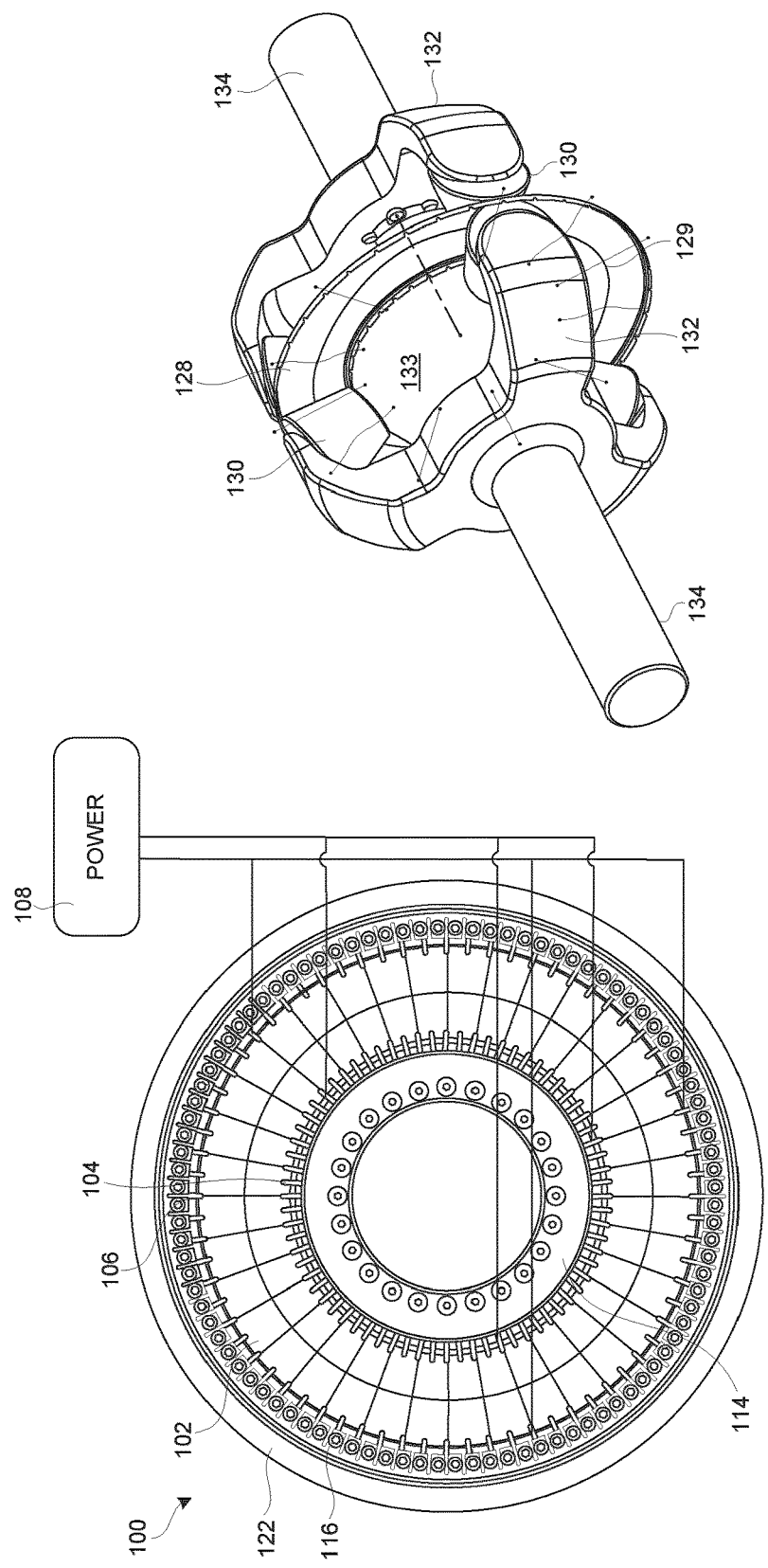
FIG. 12 is a side view of a fourth example of a buckling wave disk.
FIGS. 13-15 are views of a first example of a disk fabrication system.
Figure 14:
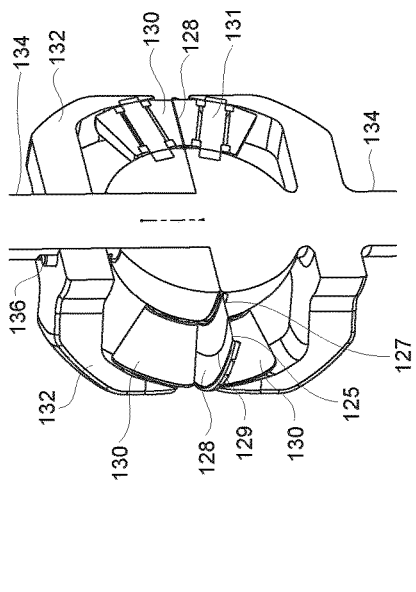

This wave propagation can be achieved in a number of ways, such as with an array of electromagnets 26 (FIGS. 3 and 4) which are powered on in sequence to draw a leading surface of each wave to one side or the other. Magnets can be attached to the bucking wave disk 12 for more force if necessary. Multiple buckling wave disks can be used for more radial contact force and increased torque transmission. The buckling wave disk 12, 32 may be made of magnetic material to cooperate with the electromagnets or incorporate or be attached to permanent magnets that cooperate with the electromagnets to drive the waves and hence the nodes around the buckled wave disk. The electromagnets may be driven by an appropriate power supply and electrical connections such as shown in FIG. 12. Titanium or nitinol are possible material choices which have high elasticity and allow higher buckling displacement. This can be beneficial in making the wave shape more stable by increasing the wave amplitude, and thus, allowing lower manufacturing tolerances. Memory materials, such as, but not limited to nitinol, can also be thermally activated in sequential regions to propagate the wave.

The wave can also be propagated by the use of active materials such as, but not limited to, piezo ceramics or electro reactive polymers. These materials can be fastened and/or adhered to or can be coated on to the buckling wave disk and contracted and/or expanded to move the waves along.

The buckling wave disk can be a solid planar disk at rest, or it can have irregular shape such as, but not limited to a circular bellows shape 43 (FIG. 4) to allow it to be more flexible. In an embodiment shown in FIG. 5, a disk 52 bounded by hub 54 and wave ring 56, with outer ring 58, may have radially extending reliefs 59. Reliefs 59 in the disk 52 which may be radial and over the whole disk 52 or possibly just the outer approximately one-third area and/or inner approximately one-third area (such as to leave an uninterrupted center approximately one-third along the highest amplitude axial wave zone) can be used to make the disk 52 more flexible and compliant.

The radial wave can be used to produce and transmit torque to the OD outer ring, and ID of the outer ring, or possibly both.

This device can also be used as an electric motor and/or generator.

Variations of this device are also conceived for producing non-rotating motion and force such as linear force.

The figures illustrate the basic principles of the present device. Many other configurations are conceivable and are anticipated by the inventor. Some or all images here are simplified and/or schematic and do not have some of the necessary features for operation such as electromagnets or fastening holes for bolts etc., but anyone skilled in this art will understand the principle and how it can be applied to produce motion and torque. It is also important to note that the images are, for the most part exaggerated in the amount of deflection in any given direction.

In FIG. 1, the straight radial lines 18 are positioned at the midpoint along the axial buckling wave (in this case there are three axial wave apexes on each axial side of the buckling wave disk centerline). The curved radial lines 19 are positioned at the apex of the axial waves. The disk has a wavy shape in the circumferential direction. The buckling takes place in the radial direction, and the wave displacement is in the axial direction.

FIG. 2 shows a wave at the top in one axial direction and at the bottom at the opposite axial direction. Also shown is the gap between the wave ring 16 and the outer ring 22. With a compressible material between the wave ring 16 and the outer ring 22, it has been shown through experimentation, that movement and torque can be transmitted without a gap at any position.

FIG. 3 shows a section view of an embodiment 30 with cylindrical housing 17 connecting fixed hub 14 to flex spline (wave ring) 16 and a bearing 33 positioning outer ring 32. Attachment of the device 30 to robot or other system can be done by interference fit, bolting, adhering, etc.

FIG. 4 is a schematic view of buckling wave device 30 shown here with an example of how a bellows shape 43 can be used to increase the flexibility of the disk 42 which will also reduce the precision requirement of fabrication.

FIG. 5 is a schematic view of buckling wave device 50 shown here with an example of how radial slots 59 can be used to increase the flexibility of the disk 52 which will also reduce the precision requirement of fabrication.

FIG. 6 shows another example of a buckling wave device 60 with a disk 62 having an array of disk slots 69. A partial segment of disk 62 with slots 69 is shown here.

Many other slot or hole configurations are possible and anticipated by the inventor. This is given as an example of only one of many possible configurations.

Preferably radial slots 59 or 69 can be used in this or other patterns to maintain preferably uninterrupted radial lines of material to provide high radial load capacity at radial wave crests. The slots 59 or 69 for example are useful to allow the OD to be compressed to a smaller diameter and the ID of the disk to be expanded to a larger diameter during assembly. Using slots in this way reduces or eliminates the need to roll-form the disk.

In an example of an FEA analysis of a bucking wave disk, it has been found that 100 pounds radial force per radial wave crest generates a wave height of 0.006" (compared to the radial wave trough). 0.005" is needed to create buckle wave with a 0.0025" radial reduction of the OD of the disk and a 0.0025" radial increase of the ID of the disk (but less would work as well) so this should work.

The key is that the wave generator ring 16, 36, 56 needs to counter the outward force of the disk 14, 34, 54 to create the wave shape, while the non-buckled zones 18 of the disk 14, 34, 54 need to have enough radial force capacity to exert an additional outward force that is sufficient to engage gear teeth or create enough preload and traction to transmit torque to the outer ring 22, 32, 52. If it is another 50 pounds per wave crest, then a traction drive configuration could perform as follows:

If 100 pounds of force at each nonbuckled zone is adequate to create the wave shape shown in these FE analysis and if the non-buckled zones can exert/withstand 150 pounds or radial compressive force without damage, then the total force available to generate a traction interface (or gear mesh) at each wave crest is 50 lbs. 50 pounds force with a 0.4 coefficient of friction is 20 pounds of traction. Six traction points (in this example, recognizing the fewer or more traction or gear interface zones can be used) results in 120 pounds of tangential force which, with a 6" diameter wave generator OD results in a torque capacity of 30 pounds per disk.

With 4 disks aligned axially, for example (more or fewer disks may be used) the toque capacity with traction interface would be 120 lbs. Actual real world results will vary from the FEA analysis. The intent here is to describe the working principles.

In one FEA, a section of a 0.008 spring steel disk 12, 32, 52 with 0.0025" ID and OD inward displacement was used. To make the inconsistencies of two similarly manufactured disks 12, 32, 52 cancel each other out, one might rotate one of them 180 around x and y axes. This analysis showed that the device 10, 30, 50 would buckle as indicated. For this example, it was found that 500 pounds is the upper limit of the 0.008" material at a radial section. Keeping the load down to 150 pounds max per radial wave crest with two disks having 50 pounds preload per radial wave crest each, would result in 200 pounds radial force per radial wave crest (combined for two disks) and 1200 pounds total radial force available for traction or gear mesh. At a 6" diameter and a 0.4 CF that is 400 foot pounds of output torque.

In another FEA, a 200 pounds load was placed on a single disk wave crest with a section of the disk in an aligned state. The maximum compressive stress is well within the material limits of common spring steel. Many other materials may be used. Materials with a low hysteresis and cold flow are preferable.

The operating principle uses the orbiting propagation of two or more opposing or equally spaced or arrayed axially displaced wave crests on either side of a plane that passes through the circular ID and OD of the disk 12, 32, 52. Formation of this wave during fabrication or assembly results in a radially aligned inflection line 18 at a midpoint between each opposing axial wave apex. This radially-aligned zone is capable of exerting higher radial forces on the outer wave ring than the areas between these radial inflection lines (where the disk is radially buckled to form the axial wave peak/s and trough/s). Propagation of these waves is, as with many solid materials, a very efficient process with very little friction loss resulting in a high efficiency input mechanism and low heat generation. The wave can be propagated in a number of different ways as is described in the various embodiments.

The device may be used to transmit power such as but not limited to electrical, mechanical, aerodynamic, electro-reactive or chemical power into rotational motion. In the strain wave speed change device 10, 30, 50 a circular disk 12, 32, 52 is caused to buckle radially by being radially constrained between two concentric members. The buckling of the disk during fabrication and/or assembly is done in such a way as to define two or more opposing axially displaced wave crests which result in an equal number of radial wave crests midway between each axial wave crest.

In one embodiment, applying an axial force to the disk rotationally ahead or behind one or more axial wave crests will propagate the wave around the disk. At a midpoint between the crest of one wave and the adjacent crest of the opposing wave (which could also be referred to as the trough of the same wave if viewed from an axial direction), the disk material is aligned along a radial line 18 between the concentric members. Along this line a higher load is exerted radially on the concentric constraining members by the wave disk than is exerted by the buckled areas in-between each radially aligned area. The present device takes advantage of the high load support capability available at the radially aligned section between each wave crest and trough. This high load line can be used to create a differential in a number of different ways, including but not limited to those presented in this disclosure.

In an exemplary embodiment, the outer constraining ring 16, 36, 56 is placed inside another ring 22, 32, 52 that has a slightly larger inner diameter than the outer diameter of the outer constraining ring 16, 35, 56. The outer constraining ring is flexible enough that the radially aligned load bearing lines on the wave disk cause radial high points to be created in the outer constraining ring, causing contact between the OD of the outer constraining ring and the ID of the outer ring. Peristaltic motion of the outer constraining ring, when the wave is propagated, causes the outer ring to spin. In this way, the propagation of the wave causes the outer ring of the device to spin.

Different methods of propagating the wave around the ring are possible, including but not limited to using coatings of piezo materials which deform sections of the wave axially and or radially with active electrical input, or using electromagnets to pull the wave around, or mechanically pushing the wave around using mechanical contact such as but not limited to a bearing or a bushing. Air or other gasses can be directed at the wave to propagate the wave using the Coanda effect and/or the Bernoulli principle. Embodiments of the device can also be used as a speed increaser by backdriving the output. In this configuration, the device can be used to generate power though the use of piezo materials, and/or electromagnetic coils or other power generation strategies.

At the inflection point of the axial wave, where it transitions between crest and trough, the wave disk is capable of maintaining high loads in the radial direction. This inflection point moves around the fixed members as the wave propagates, creating radial high spots. Because the high spots are on an OD circumference that is less than the circumference of the ID of the outer ring they are contacting, there is a differential drive created that causes rotational motion. This contact can be a preloaded traction contact, or it can have a toothed or patterned contact interface which may or may not be preloaded.

Other methods of creating the radial buckling effect are possible by employing this principle. For example, instead of holding the ID and OD edges of the disk from flexing axially as in the previous example, the ID and/or OD edges are allowed to tilt axially about their line of contact. The contact line of the disk OD will preferably roll axially around a generally circumferential axis on the ID of the wave ring 16 as the axially displaced circumferential wave propagates.

Experimentation has shown that securing the ID and OD edges of the wave disk to prevent tilting as the wave propagates, is an efficient construction.

In an exemplary embodiment, an inside hub 14, 34, 54 is machined that has OD which secures the ID of the wave disk 12, 32, 52. The inside diameter of the wave disk 12, 32, 52 is preferably smaller than the OD of the hub. In this exemplary embodiment, the OD of the hub is 3.005" and the ID of the wave ring before assembly is 3.000". It is also preferable to create a similar interference between the OD of the wave disk and the ID of the outer constraining member 16, 36, 56. In this case, the OD of the disk before assembly is 6.005" and the ID of the outer constraining member before assembly is 6.000". During assembly, the radial compression of the wave disk ID and OD creates a scenario where a 4.5"

radial circle (when viewed along the axis of the device) will have a longer circumferential length than a circle of the same diameter and the disk will naturally buckle if the disk is sufficiently thin. In this example, a 0.004" thick spring steel wave disk has been found to provide the necessary rigidity and flexibility to buckle and also provide a suitable radial load bearing capacity at each of the inflection points. Many different materials can be used in the construction of this device. In this exemplary device, aluminum is used for the hub 14, 34, 54 and outer constraining members 16, 36, 56. In this exemplary device, the hub and outer members are shown as connected in such a way as to allow sufficient radial elastic deformation of the outer constraining member. The outer ring can be of many different materials. Aluminum is used in this device so the thermal expansion coefficients of the parts are consistent. A Torlon or other slightly softer material may be used between the OD of the outer constraining member and the ID of the outer member to prevent metal to metal contact.

Radial slots can be cut into the wave disk to promote the wave being created in the disk. Provisions are made so that the inside and outside diameters of the wave disk are clamped in place parallel to radial lines in the disk. The outside diameter of the wave disk is clamped into the center hub in a way that transmits force radially. The outer hub has an inside diameter that is slightly larger than the outer circumference of the frictional lining. In some embodiments of the present device, installation of the wave disk may require pre-stressing it axially into the desired wave shape prior to installation or during installation.

FIG. 7 shows three different types of radial disk buckling that could be employed. For many applications, it is believed that the third will be the most efficient due to there being no pivoting motion.

In the embodiment shown in FIGS. 8, 9, 10 and 11, a wave buckling device 80 has a disk 82 formed of a stack of two wave disks. The wave disk 82 is secured to a hub 84 by a clamping ring 85. The wave disk 82 is constrained by outer constraining member 86 that connects via flexible back plate 87 to the hub 84. The parts 84, 86 and 87 may be made of a single piece of material. The wave disk 82 is secured to the outer constraining member 86 by outer disk clamping ring 90. Electromagnets 96 or other devices as disclosed may be used to propagate a wave around the wave disk 82. A traction member 94 made of elastomeric material or more rigid material such as, but not limited to, metal or ceramic may occupy the space between the outer constraining member 86 and an outer ring member 92. The traction member 94 may function as an axial positioning bushing for side loads. Radially aligned inflection lines 98 are formed between radially buckled waves of the disk 82. If more than one disk 82 is used, they may be spaced apart to avoid sliding or fretting contact between them.

Referring to FIG. 12, a buckling wave disk device 100 uses a wave disk 102 that is formed of an electro reactive material or has a disk coating of electro reactive material. The disk 102 is provided with inner electrodes 104 and outer electrodes 106, and is held between hub 114 and wave ring 116. Another ring 122 is provided. The electrodes 104 and 106 are provided in three equally spaced arrays that are energized by power supply 108 to affect the shape of the piezo activated disk 102. Three arrays are used as an example here because there are three waves in this disk 102 on each side of the disk plane, so the same signal to three positions will cause the disk to straighten or bend in each local area affected by the electrodes to an extent depending on the material properties and the electric signal. Electro reactive materials may be used to change the curvature of the disk in the radial and/or circumferential direction.

Straightening the wave radially, for example behind a wave apex as it propagates, will add more speed and/or torque to the wave propagation. Increasing the curvature of a wave radially ahead of a wave apex as it propagates will add more speed and/or torque to the wave propagation. Some electro reactive materials such as piezo ceramics can also produce electricity if they are deformed. By using these materials in this way, it is believed possible to generate electricity with this device when applying torque and rotation to the outer member. This can also provide a breaking force if desired.

A disk fabrication system is shown in FIGS. 13-18. On both sides of a disk 128, one or more rollers 130 mounted on roller carriers 132 are arranged to rotate on a shaft 134. The rollers 130 are supported on bearings 131 that are held on respective ends in the roller carrier 132 and a central ball 133 at the end of the shaft 134. The disk 128 is held between opposing rollers 130. Means of securing and rotating the carriers 132 are not shown but may connect to the shafts 134. The opposing rollers 130 exert axial force on the wave disk 128 that starts as a flat disk at the beginning of the process. The exemplary disk 130 shown here is pre-formed with a cylindrical feature on OD and ID. The disk 128 preferably starts with a thicker section where the circumferential wave is to be formed. Thus starting at the ID and OD, the disk 128 gradually thickens, for a non-limiting example, as an arc or linearly towards the center line 129 (FIG. 15) of the disk 128. As the disk 128 spins relative to the roller carriers 132, the axial force of the rollers 130 roll-forms the radial midline area 129 of the disk 128 such that it becomes circumferentially longer along the wave shape as compared to a circle of equal radius.

In the manufacturing process, the wave disk 128 may have sections 125 and 127 toward the ID and OD of the disk 128 that are circular and planar and a circular section at the midline area 129 larger than the ID and smaller than the OD that is rotationally symmetric and without a wave shape before roll forming, and is then plastically compressed between forming members such as, but not limited to rollers, 130 to circumferentially lengthen the material, between the planar circle 125 toward the ID and planar circle 127 toward the OD, beyond its elastic limit so that a permanent circumferential wave is formed in the material of the wave disk 128 while in contact with the forming tool and/or after the disk 128 is removed from the forming tool.

The rollers maintain angular alignment with each other but may be slightly out of angular phase to initiate the axial wave in a specific direction. Post heat treatment of the material may be done in a similar fixture while the disk is rotating through rollers, to ensure the disk 128 does not set in a particular wave position. If a manufacturing process does bias the wave form to a particular position, so that the disk has an asymmetric construction, this asymmetry or bias can be balanced out during assembly of the actuator with another biased disk in an opposing orientation, for example at 180 degrees to the other disk in relation to their position during manufacturing.

Figure 15:
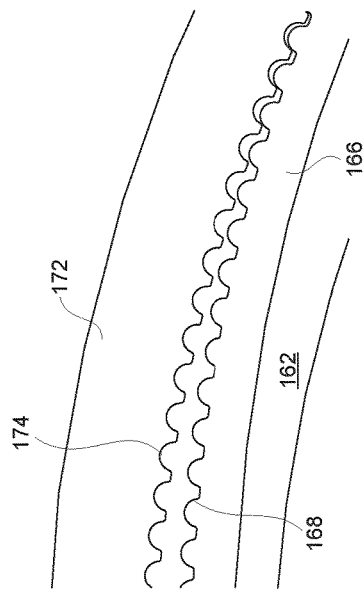

As shown in FIG. 15, a spline on the carriers 132 allows axial movement of the carriers 132 on the shaft 134 relative to each other but keeps them at the desired angle. In some embodiments, this angle may be changed as the wave form amplitude increases during the rolling process.

Figure 16:
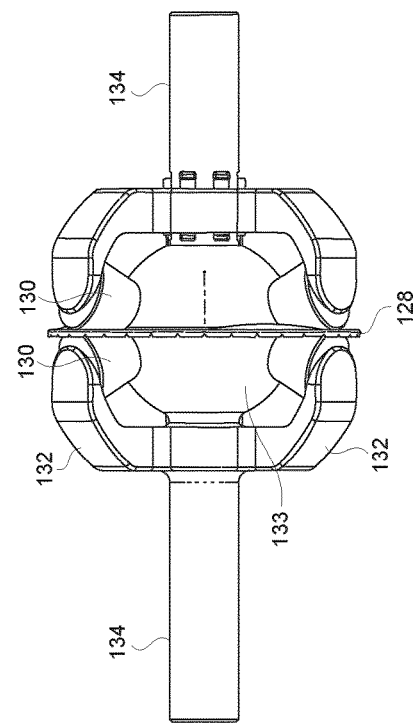
FIG. 16 is a cross-section showing a second example of a disk fabrication system.

As shown in FIG. 16, a wave disk 142 is processed between two rollers 140 mounted on bearings 131. The wave disk has an inner cylindrical feature (flange) 143 and outer cylindrical feature (flange) 144. The rollers 140 have matching wavy surfaces 146 that create a slight spring compliance at the inflection point of the disk 142 when assembled.

This will reduce the radial force capacity of the disk radial inflection lines but may have the advantage of reducing the precision requirement of the assembly for some applications. Reduction of precision requirement is the result, in this case, of increasing the internal compliance of the wave high points so the peak stress is reduced. This will reduce the tendency of the radial wave crests to cog or detent to the lowest energy position if the mating components are out of round.

Figure 17:
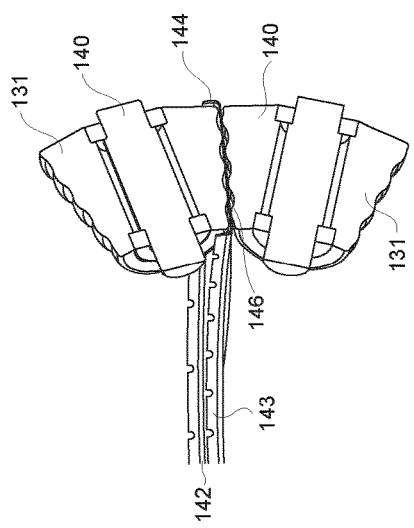
FIG. 17 shows an example of a gear tooth arrangement for use with the buckling wave disk.

FIG. 17 shows an example gear tooth connection between a strain wave ring 166 on the OD of a wave disk 162 and outer member 172. The teeth 174 on the outer member 172 are defined between semi-cylindrical troughs separated by about ⅓ of the trough length, with the separation being rounded in a direction opposed to the troughs. The teeth 168 on the wave ring 166 have a corresponding or matching shape, with semi-cylindrical peaks separated by semi-cylindrical troughs that are about ⅓ the length of the semi-cylindrical peaks. The number of teeth or lobes on the outer ring may be greater than the number of teeth or lobes on the wave ring preferably by a factor of the number of inflection points corresponding with the number of radial high points on the wave ring. For example, if there are three radial high points on the wave ring, the outer ring could have three more teeth than the wave ring or 6 more teeth or 9 more teeth or 12 more teeth, etc.

Figure 18:
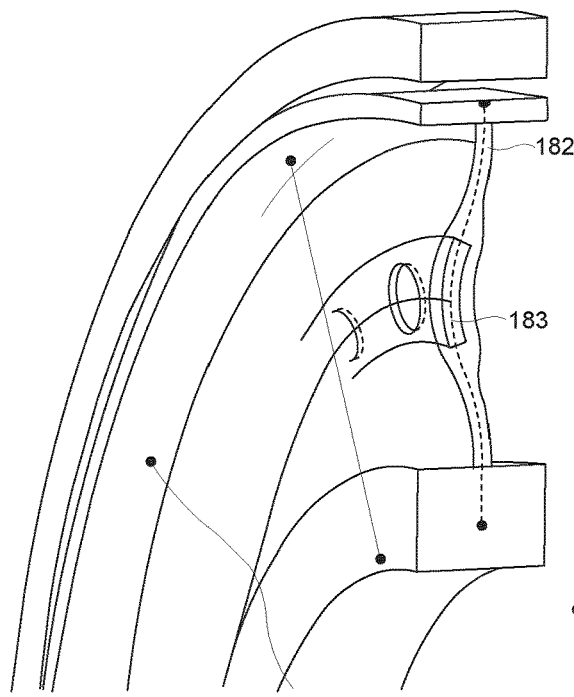
FIGS. 18 and 19 show perspective views, partly cut away of molded versions of the buckled wave disk.
Figure 19:
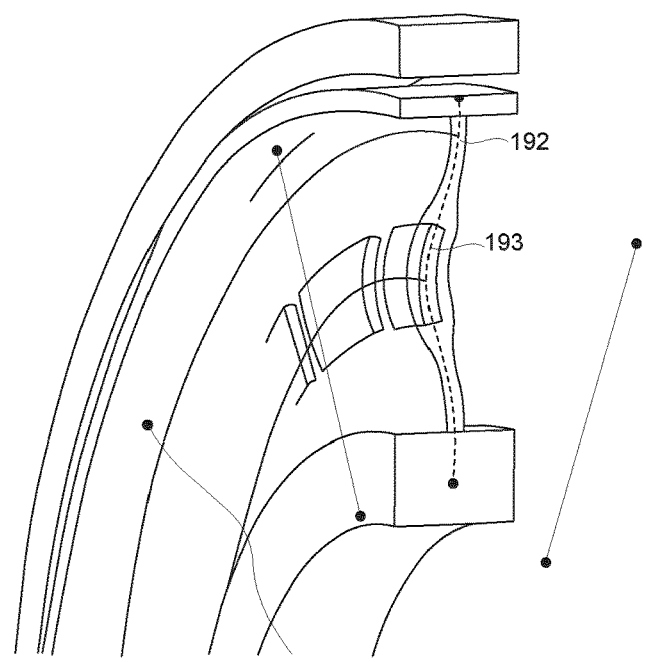

FIGS. 18 and 19 show injection molded configurations for buckled wave disks 182 and 192. An insert ring, for example a metallic ring 183 is included in disk 182. An insert 193 in ring 192 may be made of, for example, permanent magnets. The inserts 183, 193 each have a lower coefficient of thermal expansion than the disk material, and the disk 182, 192 is molded or assembled at elevated temperature and then cooled in a mold. When the disk 182, 192 is removed from the mold, internal stress from radially inward contraction of the disk 182, 192 causes a circumferential wave to form along the insert ring 183, 193.

The mold for the disks 182, 192 have sections toward the ID and OD of the disk that are circular and planar and have a circular section larger than the ID and smaller than the OD that is rotationally symmetric and without a wave shape before or during thermal injection molding. When the disk is cooled, preferably in the mold with inserts 183, 193, and then removed from the mold, a permanent and rotationally not fixed circumferential wave is formed in the disk due to differential thermal contraction of the ID of the disk relative to the midline circumference.

The disks 182, 192 are preferably made of an injection moldable material such as but not limited to Polycarbonate thermoplastic or other materials such as but not limited to PEEK or Torlon or other resins with an axially flexible reinforcement ring around the midline with a lower average coefficient of thermal expansion that resists circumferential compression to a greater degree than the injection molded material. This ring could be, as a non-limiting example, an array of magnets or a steel ring. The disk may also have an ID insert of a different material such as steel or aluminum or a more rigid plastic, that resists radially inward deflection of the disk ID. In the wave formation process, the disk is injection molded with a circumferential insert at the midline that resists compression. The rest of the disk is molded from a material that sets at a high injection molded temperature and then shrinks inward at the OD when de-molded. The disk is ideally cooled inside the mold so it does not have a biased/rigid wave position when de-molded.

In the claims, the word comprising is used in its exclusive sense. Use of the indefinite article in the claims before an element or later use of the definite article to refer to the element does not exclude more than one of the element being present.

The invention claimed is:

1. A power conversion device, comprising:
 a buckled wave disk having an axis and being radially compressed between a hub and a wave ring, the buckled wave disk being buckled in the radial direction to form circumferential waves which are displaced in the axial direction and extending around the buckled wave disk with lines formed of inflection points of the circumferential waves extending between the hub and wave ring, the wave ring being outwardly radially displaced at nodes corresponding to lines formed of inflection points of the circumferential waves;
 a wave propagation actuator cooperating with the buckled wave disk for driving or being driven by a wave and the lines formed of inflection points of the circumferential waves around the buckled wave disk; and
 an outer ring surrounding the wave ring, the outer ring being driven by or driving the wave ring at the nodes.

2. The power conversion device of claim 1 in which the lines formed of inflection points of the circumferential waves formed radially extending lines or areas of zero axial displacement.

3. The power conversion device of claim 1 in which the hub is connected to the wave ring by a housing.

4. The power conversion device of claim 3 in which the housing comprises a disk.

5. The power conversion device of claim 1 in which the wave propagation actuator is rotationally stationary with respect to the wave disk.

6. The power conversion device of claim 5 in which the wave propagation actuator comprises an electromagnet.

7. The power conversion device of claim 5 in which the wave propagation actuator comprises a piezoelectric element or electroactive materials.

8. The power conversion device of claim 1 in which the buckled wave disk comprises plural disks.

9. The power conversion device of claim 8 in which each of the buckled wave disks has rotationally asymmetric construction and the buckled wave disks are oriented with respect to each other to tend to balance out the asymmetry.

10. The power conversion device of claim 1 in which the buckled wave disk has radially extending slots.

11. The power conversion device of claim 10 in which the radially extending slots do not intersect an interior circumferential line on the buckled wave disk that is midway between the hub and wave ring.

12. The power conversion device of claim 1 in which the buckled wave disk has inner and outer flanges.

13. The power conversion device of claim 1 in which the outer ring is supported on bearings on the wave ring.

14. The power conversion device of claim 1 in which the outer ring is arranged to drive the wave ring.

15. The power conversion device of claim 1 in which the wave ring is arranged to drive the outer ring.

16. A power conversion device, comprising:
 a buckled wave disk having an axis and being radially compressed between a hub and a wave ring, the buckled wave disk being buckled in the radial direction to form circumferential waves which are displaced in the axial direction and extending around the buckled wave disk with radial lines of outward displacement extending between the hub and wave ring, the wave ring being outwardly radially displaced at nodes corresponding to the radial lines of outward displacement;

a wave propagation actuator cooperating with the buckled wave disk for driving a wave and the radial lines of outward displacement around the buckled wave disk; and an outer ring surrounding the wave ring, the outer ring being driven by or driving the wave ring at the nodes.

17. A method of power conversion, comprising:

providing a buckled wave disk having an axis and being radially compressed between a hub and a wave ring, the buckled wave disk being buckled in the radial direction to form circumferential waves which are displaced in the axial direction and extending around the buckled wave disk with lines formed of inflection points of the circumferential waves extending between the hub and wave ring, the wave ring being outwardly radially displaced at nodes corresponding to lines formed of inflection points of the circumferential waves;

causing a wave propagation actuator to cooperate with the buckled wave disk to drive or be driven by a wave and the lines formed of inflection points of the circumferential waves around the buckled wave disk; and further providing an outer ring surrounding the wave ring, the outer ring being driven by or driving the wave ring at the nodes.

* * * * *